(No Model.)
J. NILE.
ROACH AND INSECT TRAP.
No. 464,343. Patented Dec. 1, 1891.
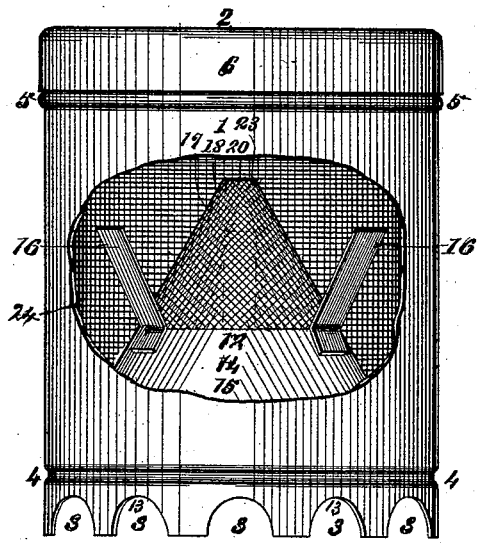
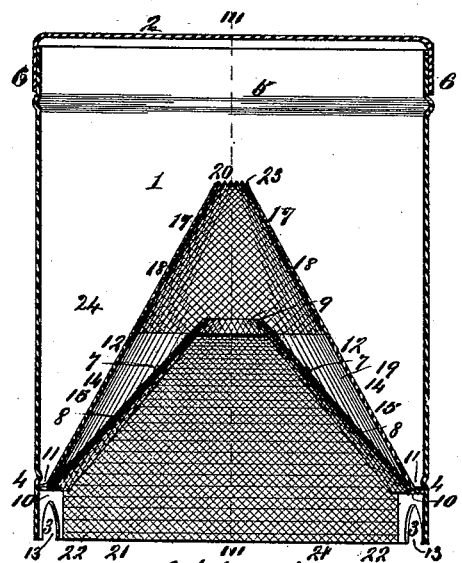
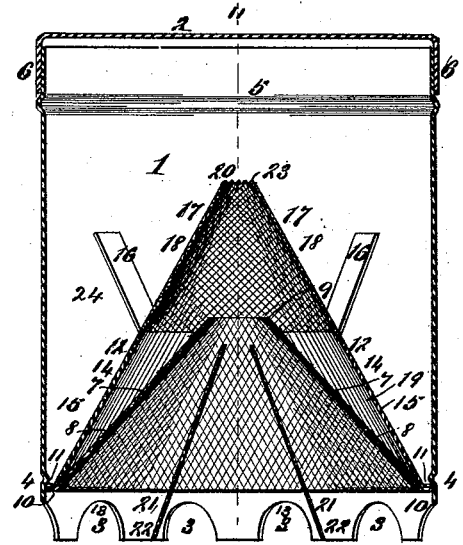
Attest:
Walter E. Allen
Arthur O. Knight
Inventor,
John Nile.
By Knight Bro's.
Attys.

UNITED STATES PATENT OFFICE.

JOHN NILE, OF ST. LOUIS, MISSOURI.

ROACH AND INSECT TRAP.

SPECIFICATION forming part of Letters Patent No. 464,343, dated December 1, 1891.

Application filed July 28, 1891. Serial No. 400,927. (No model.)

*To all whom it may concern:*

Be it known that I, JOHN NILE, of the city of St. Louis, in the State of Missouri, have invented a certain new and useful Improvement in Roach and Insect Traps, of which the following is a full, clear, and exact description, reference being had to the accompanying drawings, forming part of this specification.

This invention relates to a box-trap for catching roaches and other insects, said trap being provided with a series of inlet-arches around its base and with duplex perforated and partially-perforated cones, having open ports for the insects to crawl through at the apex of said cones, there being one said cone within the other in the interior of said box, and perforate ascending inclines within the inner cone, the latter provided to facilitate the ascent and passage of the insects to and through the open port at its apex; and the invention consists in features of novelty hereinafter fully described, and pointed out in the claims.

Figure I is an elevation of the box-trap and shows the arched entrances at its base with part of the side of the box broken away to show the secondary cone with its perforate peak and imperforate base, between which base and the sides of the box the bait is placed. It also shows the overlap strips that, when bent down over the baited paper, hold it captive for the decoy of the insects. Fig. II is a vertical section taken on line II II, Fig. III, and shows the initial and the secondary cone and the broad side of one of the ascending planes *via* which the insects creep to its open port; and Fig. III is a vertical section taken on line III III, Fig. II, and shows, consequently, the same parts on a right-angle plane to that of Fig. II, and also shows an end view of the two ascending planes.

Referring to the drawings, 1 represents the box, which, with its entrapping devices, is preferably made of tin, but may be of any other suitable material, and in which said entrapping devices are housed. 2 is the lid of said box, and 3 the arched entrance-ports in its base through which the cockroaches or other insects pass to enter the trap. I have represented said entrances of arch form as the most convenient form consistent with the strength of the adjacent parts of said box; but I do not confine myself to that shape, for it is evident that the outline form of said apertures may be changed without any departure from the essential features of my invention.

4 represents a peripheral inset impressed bead around the box a short distance above the summit of the arched entrance-ports, and 5 is an outset impressed bead around near the top of the box, against which bead the flange 6 of the lid 2 closes down when in place.

7 represents the initial cone, which is closely pierced with perforations 8, which aid the insects in their ascent and allow free egress of the scent of the bait to escape and lure said insects to their entrapment.

9 represents the open port through which the insects creep at the apex of said initial cone. The peripheral base-flange 10 of said initial perforate cone is soldered or otherwise attached to the base-flange 11 of the secondary cone 12, and said attached base-flanges of said two united cones are securely attached to the under side of the insect-bead 4, preferably by soldering, or said attachment may be secured by any other suitable means. Beneath said initial cone is the ante-chamber 13 that the insects first enter. The lower moiety 14 of said secondary cone is imperforate, so as with the adjacent side of the box to form a molasses-tight receptacle 15 for the bait, which is preferably composed of a strip of paper coated with molasses on its upper side, which is placed around said lower imperforate moiety of the secondary cone, and the metal overlap-strips 16, whose lower ends are soldered to the summit of the said imperforate moiety of the cone, are bent down from the position shown in Figs. I and III onto said baited paper to overlap and securely hold the same.

17 represents the upper moiety of the secondary cone, which, like the whole of the initial cone, is closely pierced with perforations 18, that both allow the free escape to the intercone-chamber 19 of the scent from the molasses to lure the cockroaches or other insects on their travels to reach the sweet bait, and provides footsteps to aid in climbing upward toward the open port 20 at the apex of the perforate moiety of said secondary cone, which open port is plainly in sight to the hungry anxious traveler.

21 represents the duplex inclined ascending tapering planes, that are soldered or otherwise secured to the side base of the box beneath the initial cone and to said cone, and said planes are placed on an incline, their tapering summits reaching within a convenient distance of the open port 9, so that cockroaches or other insects that have ascended said planes can easily step or crawl therefrom through said open port 9. The said planes are closely pierced with perforations 22, that serve as footsteps for the travelers. It will also be seen that serrations 23 surround the open port 20, and that while said serrations do not obstruct the entrance-passage of the roach or insect, yet if the prisoner attempts to make its exit the inwardly-inclined serrations act as a *cheval-de-frise* to obstruct its escape.

The operation of the device is as follows: A bait, preferably composed of a strip of paper or cloth spread over on its upper side with molasses, is laid around the imperforate base of the secondary cone, and the metal overlap-strips 16 are bent over on top of it to secure its retention in place. The above-described bait is preferred for the simple reasons that the roaches and other insects for the entrapment of which the trap is set appear to prefer it, and also the scent of the molasses is very attractive to the insects and permeates the entrance-passages that are traveled by them on their way, thus luring them within the trap; but any other suitable bait, as chipped potatoes, melons, &c., may also be successfully used as bait, and are, when used, placed in the same position, between the imperforate base of the secondary cone and the sides of the box. The trap being thus baited and set, it is abundantly able to receive and take care of its visitors. The roach or other insect is attracted by the scent of the bait to the arched apertures 3, through which it passes into the ante-chamber 13, and preferably would be likely to crawl up one of the perforate inclined planes 21 to the open port 9 of the initial cone 7, although if said planes are already crowded with other insect visitors the perforate sides of said initial cone itself, although not as easy of ascent as the inclined plane, yet the perforations therein provide a sufficient foothold to make the ascent quite practicable for almost any of the tribe of pest insects. The insects pass either from said perforate inclined planes or from the perforate inside of said initial cone through the open port 9 into the intercone-chamber 19, where the scent of the bait becomes still more attractive, but still out of reach.

The scent of the bait evidently comes through the perforate upper moiety of the secondary cone, and the insects in consequence climb its sides to and through the open port 20 at its apex. The serrations around said open port do not obstruct the passage of the insects as they pass outward through the same, as they slip past and not toward said serrated points, as they would afterward have to if they subsequently endeavored to pass back *via* the same opening.

Where roaches are very abundant, traps have been found in the course of a few hours after setting full of roaches to the lid.

I claim as my invention—

1. In a roach and insect trap, the combination of the imperforate box 1, having the imperforate lips 2, the dark trap-chamber within it, and the entrance-ports 3 at its base, the perforate initial cone 7, having the open port 9 at its apex, the secondary cone 12, having the imperforate base 14, constituting, with the side of the box 1, a moisture-proof bait-chamber, the perforate upper section of said secondary cone having the open port 20 at its apex and the serrations 23 around said open port, substantially as described.

2. In a roach and insect trap, the combination of the box, the said box having entrance-ports 3 at its base, the initial cone 7, provided with perforations 8 and with the open port 9 at its apex, the inclined ascending plane 21, the ante-chamber within said cone, the secondary cone 12, the open serrated port at the apex of said secondary cone, and the intercone-chamber between said cones, substantially as and for the purpose set forth.

3. In a roach and insect trap, the combination of the box, the said box having entrance-ports 3, the initial cone 7, provided with perforations 8 and with the open port 9 at its apex, the inclined plane 21, being provided with the perforations 22, the ante-chamber 13 within said cone, the secondary cone 12, having an imperforate base 14, the upper section 17 of said cone being provided with the perforations 18, and having the open port 20 at its apex, the serrations 23 around said open port 20, and the intercone-chamber 19 between said cones, substantially as and for the purpose set forth.

4. In a roach and insect trap, the combination of the box, the lid to said box, the said box having the entrance-ports 3, the initial perforate cone 7, having the open port 9, the ante-chamber 13 within said cone, the perforate inclined plane 21 in said ante-chamber, the secondary cone 12, the intercone-chamber 19 between said cones, the said secondary cone consisting of the imperforate base 14 and the perforate summit 17, and having the open port 20 at its apex, the serrations 23 around said open port, the trap-prison 24, and the overlap-strips 16, that bend down over the sweetened bait-sheet, substantially as and for the purpose set forth.

JOHN NILE.

In presence of—
BENJN. A. KNIGHT,
SAML. KNIGHT.